Jan. 5, 1971  NORIO YAMADA  3,552,007
BATTERY POWERED DRY SHAVER HAVING ROTARY SHAVING HEAD
AND RETRACTIBLE TRIMMER
Filed Nov. 15, 1968                                6 Sheets-Sheet 4

INVENTOR
Norio Yamada
BY
Pierce, Scheffler & Parker
ATTORNEYS

Jan. 5, 1971 NORIO YAMADA 3,552,007
BATTERY POWERED DRY SHAVER HAVING ROTARY SHAVING HEAD
AND RETRACTIBLE TRIMMER
Filed Nov. 15, 1968 6 Sheets-Sheet 6

INVENTOR
Norio Yamada
BY
Pierce, Scheffler & Parker
ATTORNEYS

United States Patent Office 3,552,007
Patented Jan. 5, 1971

3,552,007
BATTERY POWERED DRY SHAVER HAVING ROTARY SHAVING HEAD AND RETRACTIBLE TRIMMER
Norio Yamada, Kadoma-shi, Japan, assignor to Matsushita Electric Works, Ltd., Osaka, Japan, a corporation of Japan
Filed Nov. 15, 1968, Ser. No. 776,041
Claims priority, application Japan, Apr. 29, 1968, 43/28,731
Int. Cl. B26b *19/26*
U.S. Cl. 30—34.1
4 Claims

ABSTRACT OF THE DISCLOSURE

An electric dry shaver comprising a head base member provided with a motor and a battery holder at the lower portion, said motor having a driving shaft penerating through said head base member and provided with a cam mechanism, a hand operated switch means for connecting said motor to a battery held in said battery holder, a trimmer assembly slidably contained in a receptacle formed on the upper surface of said head base member, said trimmer assembly being provided with a cam means releasably engaged with said cam mechanism of the driving shaft, a trimmer operating means in engagement with said trimmer assembly for extracting the same, and a rotary blade assembly provided on said head base member, said rotary blade assembly being provided with a cam means releasably engaged with said cam mechanism of the driving shaft; during the time when said trimmer assembly is retracted in the receptacle only the cam means of said rotary blade assembly is made to enage with the driving shaft so that only the rotary blade assembly is rotated, and during the time when the trimmer assembly is extracted from the receptacle only the cam means of said trimmer assembly is made to engage with the driving shaft so that only inner trimmer blade of the trimmer assembly is driven.

The present invention relates to improvements in electric dry shavers.

There have been suggested various types of such dry shavers having trimmer means. An exemplary one would be the type disclosed in, for example, U.S. Patent 3,392,-443 issued July 16, 1968. In the particular shaver as disclosed in this U.S. Patent, however, both of rotary blades for ordinary shaving and the trimmer blades are driven by a single shaft coupling projected from one side of a motor. In such case, practically, the trimmer blades which are normally retracted in a receptacle in the shaver body are caused, at the time when the shaver is used, to be driven simultaneously with the rotary blades. Thus, a remarkably larger load will be imposed on the motor on such occasion, and particularly in the type where dry batteries are utilized, revolutional power of the motor will be deteriorated and, thus cutting effect of the shaver will be reduced. Further, the increment in the load on the motor will cause power consumption to be increased so that effective life of the batteries will be much shortened. Also, the simultaneous rotation of the rotary blades with the trimmer blades, at the time of using the latter, might induce the hairs adjacent trimming place might happen to be touched with the rotary blade so as to be undesirably cut.

Further in the type as disclosed in the aforementioned U.S. patent, required extraction of the trimmer blades from the receptacle at the time of its use has been effected by manually pushing or shifting a pair of finger knobs provided at both sides of outer periphery of the receptacle. This operation of the knobs would normally require an attendance of a further hand of the user, rather than to be done by the particular hand holding the shaver. Thus, the provision of the knobs for extracting the trimmer blades of the type disclosed in, for example, the aforementioned U.S. patent would be inconvenient in practical use.

During the use of the trimmer blades, in the conventional shavers, further, the trimmer blades have been subjected to a certain amount of force holding the blades for preventing them from being caused to chatter. Therefore, it has been necessary to move the knobs with a considerable amount of force at the user's finger tips for extracting or retracting the trimmer blades.

Yet further, the provision of the pair of such knobs each of which being located at respective sides of the shaver body has been uncomfortable for the palm while holding the shaver.

A principle object of the present invention is to provide a dry shaver having the trimmer which being characterized in that the trimmer is, at the time of using the rotary blades, retracted in the receptacle and kept being not driven and, at the time of using the trimmer, connection between the rotary blades and a driving shaft is made to be broken by the extracting operation of the trimmer blades so that only the trimmer blades will be driven, and further in that respective retracting and extracting operations of the trimmer blades will be able to be performed with a single one-touch operation.

A further object of the present invention is to provide an improved dry shaver having the trimmer wherein each of the rotary blades and trimmer blades will be driven separately from each other by the same driving shaft so that no simultaneous driving of the both blades will be carried out, thereby the cutting efficiency will be improved and the electric power consumption will be minimized.

Other objects and advantages of the present invention will become apparent upon reading the descriptions set forth in the following in detail with reference to the drawings, wherein.

While the present invention shall now be explained with reference to the embodiment as illustrated, it should be appreciated that it is not intended to limit the invention to the particular embodiment, but rather to include all modifications, alterations and any equivalents within the spirit and scope of the present invention as defined in the appended claims.

Figure 1:
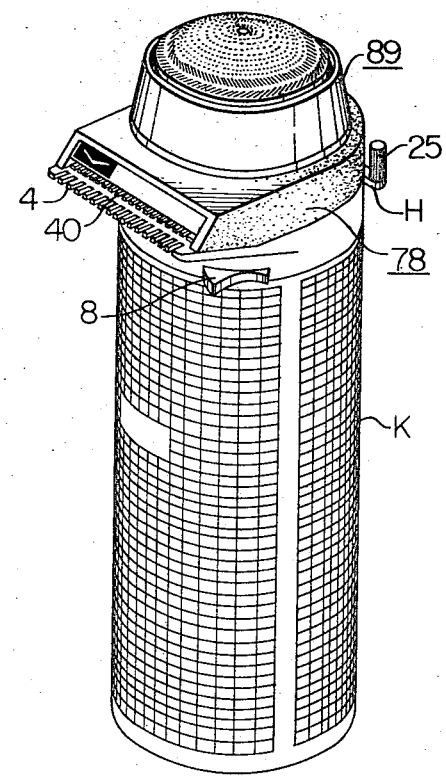
FIG. 1 shows a perspective view of an electric dry shaver of the present invention.
Figure 2:
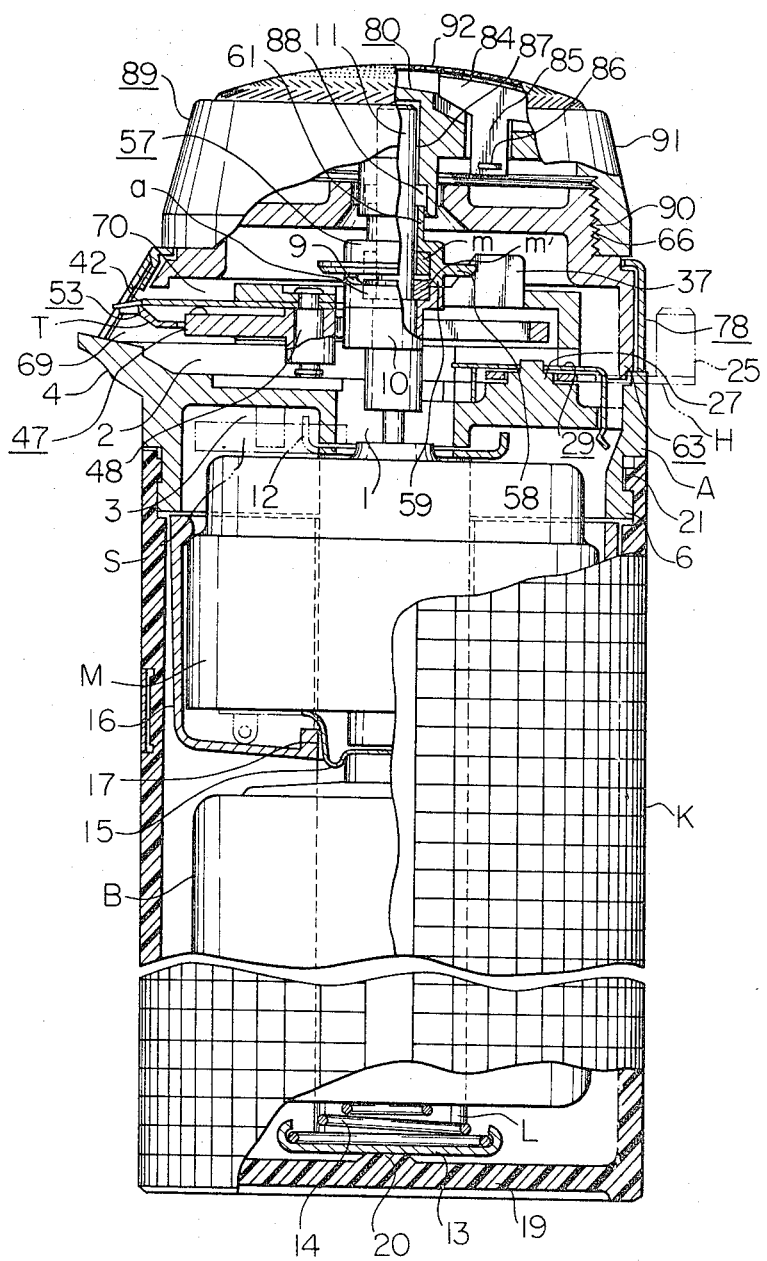
FIG. 2 is a fragmentary side view of the shaver of FIG. 1, wherein main parts being shown in a vertical section.
Figure 3:
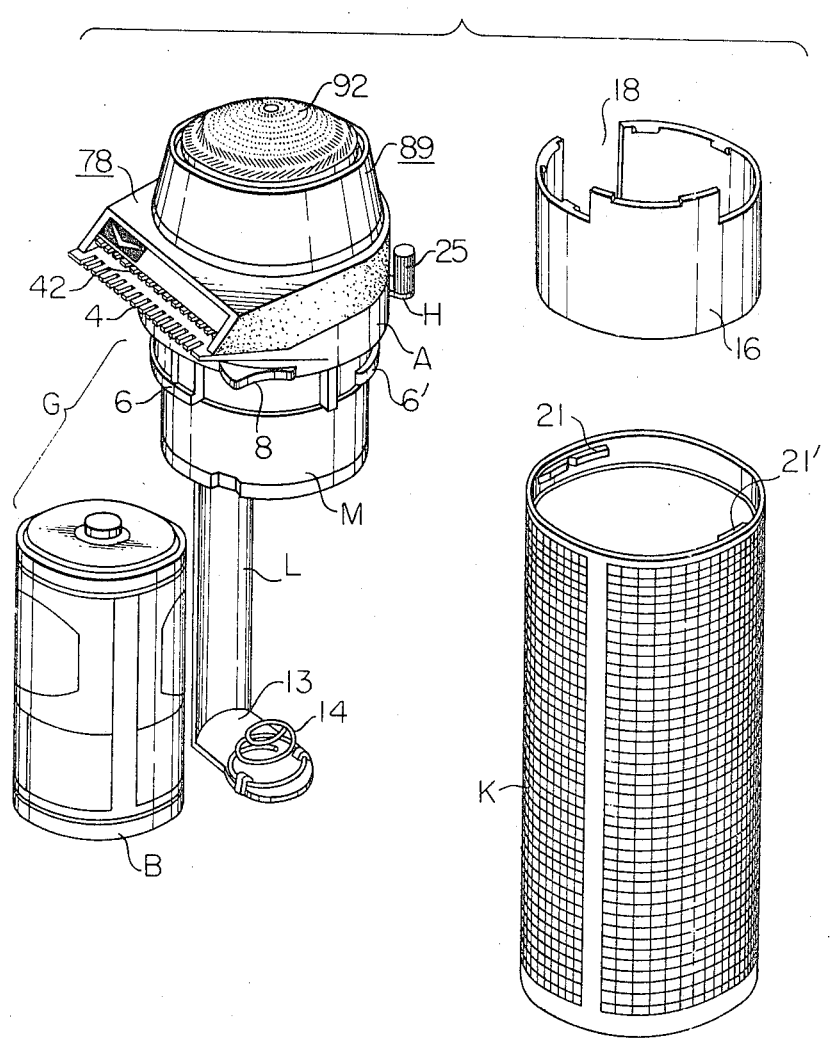
FIG. 3 is a perspective view of the shaver, wherein the body of the shaver being disassembled.
Figure 4:
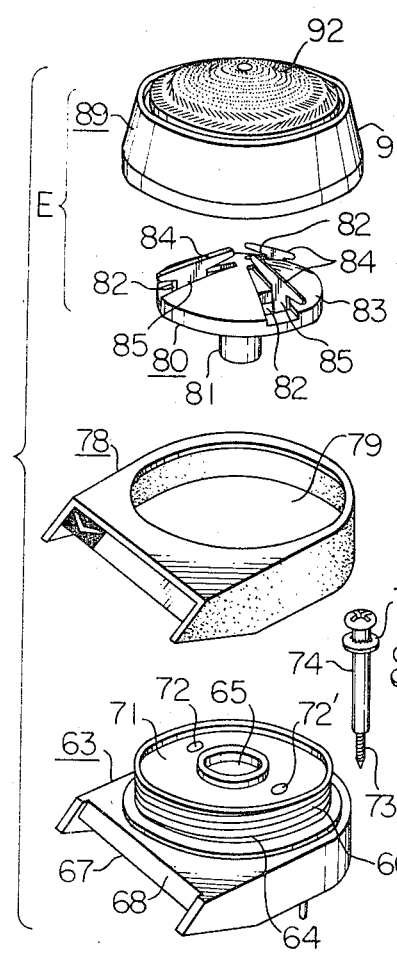
FIG. 4 is a perspective view of upper head part including the rotary blades, respective elements being disassembled.
Figure 5:
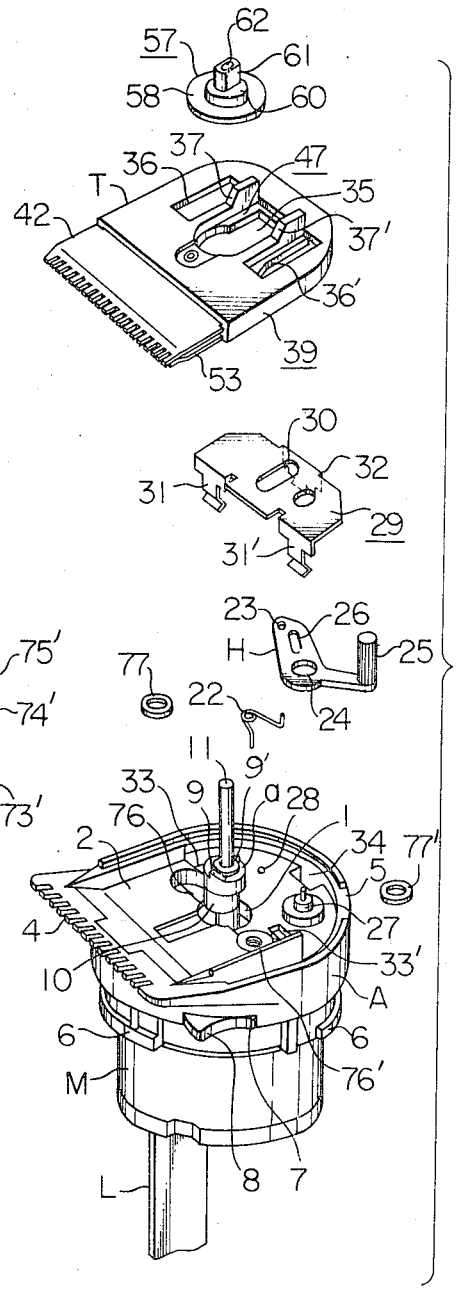
FIG. 5 is a perspective view of lower head part including the trimmer blade assembly and motor, respective elements being disassembled.

Referring now to FIGS. 1 to 6 in conjunction with each other, and generally in FIG. 2, A is a head base member, in which a round extending opening 1 at its center, an upper side concave 2 and an under side concave 3 are formed. A part of said upper side concave 2 is projected so as to form a comb part 4. 5 is a hollow cut formed at a part of peripheral wall of the upper side concave 2 (FIG. 5). 6 is a pair of screw engaging portions projected downwardly from peripheral wall of said under side concave 3 and having respectively an inclined screw face, and 7 is a hollow cut formed at said peripheral wall of the under side concave 3 (FIG. 5). S is a switch shown with chain lines in FIG. 2, which is mounted within said under side concave 3. 8 is a switch handle pivoted to the switch S in a freely reversible manner and so as to be partly exposed to outer side surface of the shaver through said hollow cut 7 (FIG. 5). *a* is a disk member having a pair of engaging projections 9, each of which is symmetrically provided at peripheral edge of upper surface of said disk member *a*. The disk member *a* is formed integrally with an eccentric cam 10, both of which are fixed at an intermediate part of a driving shaft 11, passing through axes of the member *a* and cam 10, of a motor M received in the under side concave 3 and are upwardly projected out of the upper side concave 2 through the round extending opening 1. L is a battery holding metal member (FIG. 3) substantially extending vertically, which is provided at its both ends with an upper bent piece 12 and a lower bent piece 13 oriented in the same direction with each other. The upper bent piece 12 is utilized as a contact point of the switch S and the lower bent piece 13 is further provided with a pushing up coil spring 14 fixed at upper side thereof. The upper bent piece 12 is fixedly held between lower surface of the round extending opening 1 and upper surface of the motor M. 15 is a positive terminal plate provided at lower surface of the motor M so as to downwardly project from the same. A battery B will be resiliently held between the positive terminal plate 15 and coil spring 14. 16 is a motor cover made of an insulating material, having at its bottom a receiving hole for the terminal plate 15 and at its peripheral wall a cutout 18 (see FIG. 3) for engaging with the battery holding metal member L. The above mentioned head base member A, switch S, motor M, battery holding metal member L, battery B and motor cover 16 are forming driving source part G (see FIG. 3).

K is a tubular cover member opened at an end and closed at the other end with bottom wall 19. 20 is a projection provided at the center of upper surface of the bottom wall 19. 21 is a pair of projected screw portion provided at inside peripheral wall of the cover member 19 and adjacent its open edge (as seen best in FIG. 3). Said projected screw portions 21 will be engaged at their lower peripheral edges with the inclined surface of the screw engaging portions 6 of the head base member A and will be slidingly rotated along the inclined surface so as to have the tubular cover member K fixedly fitted to the head base member A and, at the same time, to have the lower bent piece 13 of battery holding metal member L pushed upwardly by the projection 20, thereby the motor M and battery B will be covered with the tubular member K.

H is a trimmer operating lever formed substantially in the L-shape and cooperatively associated with a click spring 22 (see FIG. 5). The lever H is provided with an engaging hole 23 at an end, a shaft receiving hole 24 at its curved center portion, a handle knob 25 projectingly fixed at the other end, and an elongated hole 26 extending between said engaging hole 23 and shaft receiving hole 24. 27 is a stubby shaft projecting upwardly from bottom surface of the upper side concave 2 of the head base member A. Said shaft 27 is received by the shaft receiving hole 24 so as to pivotally support the lever H. At this pivoted position, said handle knob 25 is exposed out of the head base member A through the hollow cut 5 thereof as a guide. 28 is a hole made at the bottom surface of upper side concave 2. The click spring 22 is engaged at an end with said engaging hole 23 of the lever L and at the other end with the hole 28 of the base member A, thereby the trimmer operating lever H is rotatably mounted on the upper concave 2 while being provided with a clicking mechanism by means of the click spring 22.

29 is a supporting plate for the trimmer operating lever H and provided with a slot 30 at its center, engaging pieces 31, 31' downwardly extending from an edge and a further engaging piece 32 likely downwardly extending from the other edge (as will be seen best in FIG. 5). Said supporting plate 29 is arranged above the trimmer operating lever H and is secured to the bottom surface of upper side concave 2 in such manner that its engaging pieces 31, 31' are fitted into a pair of engaging holes 33, 33' provided in the upper side concave 2, its further engaging piece 32 is fitted into a further engaging hole 34 provided in the upper side concave 2 adjacent the peripheral wall and, at the same time, the slot 30 is positioned so as to correspond to the elongated hole 26 of the lever H, so that the lever H will be protected from being removed out of its position.

Figure 6:
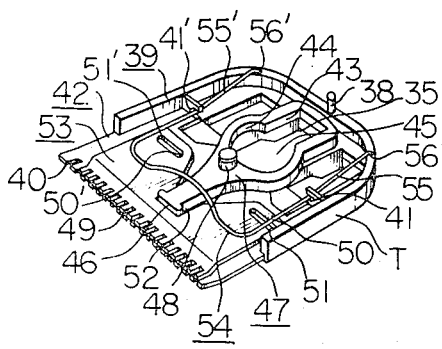
FIG. 6 shows reverse view of the trimmer blade assembly of FIG. 5.

T is a trimmer assembly, which has a transversely extending opening 35 at the center, slots 36, 36' respectively both sides of the opening 35 in a symmetrical relation, upstanding projections 37, 37' provided symmetrically on both upper peripheral side edges of the opening 35 adjacent rear end of the latter and having respectively a tapered surface, and an engaging pin 38 projected downwardly from the center of rear end edge of a base 39, on which all of the above being provided (see FIG. 5). The trimmer assembly T is further provided with a stationary trimmer blade 42 having at its forward end a blade face 40 and at its both sides of rearward end a pair of engaging hollow cuts 41, 41', the blade 42 being secured to reverse side of the base 39 with its blade face 40 being projected out of forward end of the base 39 (as seen best in FIG. 6). As illustrated in FIG. 6, the trimmer assembly T is further provided with a driving lever 47, which provided with a key-hole-shaped cam receiving opening 45 comprising an angular opening part 43 and a round opening part 44 of a larger diameter than the part 43 connected with each other, and with an engaging head 46 at its forward end. Said driving lever 47 is pivotally mounted to a pin 48 which is downwardly extending from substantially the center position adjacent the cam receiving opening 45 of the base 39. Further, there being provided with here is a trimmer inner cutter blade 53 having at its forward end a blade face 49, at both sides and adjacent its rearward end a pair of rolling slits 51, 51' for balls 50, 50', and at the center a cutout 52 for engaging with the engaging head 46 of the driving lever 47. Said inner cutter blade 53 is placed flatly against the stationary blade 42 from its under side so that both blade faces 40 and 49 are aligned with each other. 54 is a pushing-up spring formed substantially in a U-shaped and having arms 55, 55' at both ends. Free bent ends of said arms 55, 55' are engaged, respectively, with holes 56, 56' made at rearward end of reverse side of the base 39 and intermediate part of respective said arms 55, 55' is hung at the respective engaging hollow cuts 41, 41' of the stationary blade 42, so that curved portion of the pushing-up spring 54 will bias the inner cutter blade 53 so as to be resiliently slidably fitted to the stationary blade 42, thereby, the trimmer is formed.

The above mentioned trimmer assembly T will be placed on the upper surface of the base member A, in such manner that the eccentric cam 10 will be fitted into the cam receiving opening 45 and the engaging pin 38 will penetrate through the slot 30 of supporting plate 29 into the eloingated hole 26 of trimmer operating lever H. Under these conditions, the engaging projections 9 and 9' of disk member *a* integrally formed with the eccentric cam 10 will be exposed above the upper surface of the trimmer base 39.

57 is a clutch plate, which comprising a disk portion 58 having a diameter larger than that of the round opening part 44 of cam receiving hole 45 in the driving lever 47 and provided at its lower surface with a pair of nail projection 59, 59' for engaging respectively with the engaging projections 9, 9' on the disk member $a$, a stepped engaging member 60 provided above said disk portion 58 at its center, and an angular pillar 61 having a penetrating hole 62 at the center. Said clutch plate 57 is mounted to the driving shaft 11 which is freely fitted in the cam hole 45 of trimmer assembly T and extending above the latter, in such manner that the clutch plate 57 will be freely raised and lowered along the shaft 11 penetrating the hole 62 of the clutch plate 57, that the nail projections 59, 59' at its lower surface will engage with the engaging projections 9, 9' of disk member $a$ exposed above the trimmer assembly T, and that lower surface peripheral part of the disk portion 58 of the plate 57 will engage with upper surface peripheral part around the cam hole 45 of the assembly T. Under these conditions, a clutch mechanism is formed by the disk member $a$ formed integrally with the eccentric cam 10 and having the engaging projections 9, 9', the trimmer base 39, and the clutch plate 57 so that, as the trimmer assembly T is moved toward its blade surface direction responsive to the clicking motion of the trimmer operating lever H, projections 37, 37' having tapered edges of the trimmer base 39 will push up lower surface of the disk portion 58 of the clutch plate 57 so as to raise the latter, the nail projections 59, 59' will be released from engagement with the engaging projections 9, 9' and, thus, the clutching motion will be caused.

Referring now to FIG. 4, 63 is a convex type cover member, which is provided with a screw thread 64 at outer periphery of its cylindrical part 66 having a round extending opening 65 at the center for receiving the driving shaft 11 of the motor M, and with a bill 68 having a hollow cut 67 at an end. Said cover member 63 will be fitted on the upper surface of the head base member A so as to have the bill 68 engaged with the projected comb part 4 of the member A and, thus, a space 69 for extracting and retracting the trimmer assembly T will be formed with said hollow cut 67 of the bill 68 and the upper surface of the projected comb part 4 (FIG. 2). At the same time, the inner surface of the cover member 63 and the upper surface of the head base member A will form a receptacle room 70 (FIG. 2) for slidably holding the trimmer assembly T. The cover member 63 will be fixed to the upper surface of head base member A by means of screws 74, 74' provided at their lower ends with thinner screw threaded portions 73, 73'. The screws 74, 74' will be inserted into fitting through holes 72, 72' made at upper wall 71 of the member 63 through washers 75, 75' so as to pass through the slots 36, 36' of trimmer base 39, and screwed into screw threaded holes 76, 76' made at upper surface of the head base member A with their threaded portions 73, 73' through washers 75, 75', respectively. 78 is a decorative cover formed in a similar shape to the outer shape of the cover member 63 and having a round opening 79 into which the cylinder part 66 is to be fitted. Said decorative cover 78 will be mounted on the cover member 63 so as to enclose the latter, except the cylindrical part 66 which will be exposed above the cover 78 through its opening 79. 80 is an inner cutter blade body, which is provided with a downwardly extending column 81 at the center of lower surface of the body 80, with a plurality of holes 82 made radially on upper surface of an umbrella-like inner cutter blade base 83, with a plurality of inner cutter blades 84 having leg pieces 85 which are respectively inserted in said holes 82 and fixed resiliently at their lower ends by means of spring plates 86, with a shaft receiving deep hole 87 (FIG. 2) made at center axis of the column 81, and with an angular hole 88 (FIG. 2) at lower end of said deep hole 87 in which the angular pillar 61 is engaged. 89 is an outer cutter blade body having a screw thread 90 at its inner periphery of a cylindrical frame 91 and an outer cutter blade 92 in a net-like form secured to upper end of the frame 91. The driving shaft 11 extending from the opening 65 of cover member lower end of said column 81. Thus, the inner cutter blade 63 will be inserted into the shaft receiving deep hole 87 of column 81, and the angular pillar 61 of the clutch plate 57 will be engaged in the angular hole 88 at the body 80 is connected to the driving shaft 11 of motor M through said clutch plate 57 and, then, the outer cutter blade body 89 will be mounted onto the cover member 63 by screwing the screw thread 90 of frame 91 against the screw thread 64 at the cylindrical part 66 of cover member 63, so that blade surfaces of the inner cutter blades 84 will be resiliently engaged with inside surface of the outer cutter blade 92 and, thus, the rotary blade assembly E is formed with said inner cutter blade body 80 and outer cutter blade body 89.

Figure 7A:
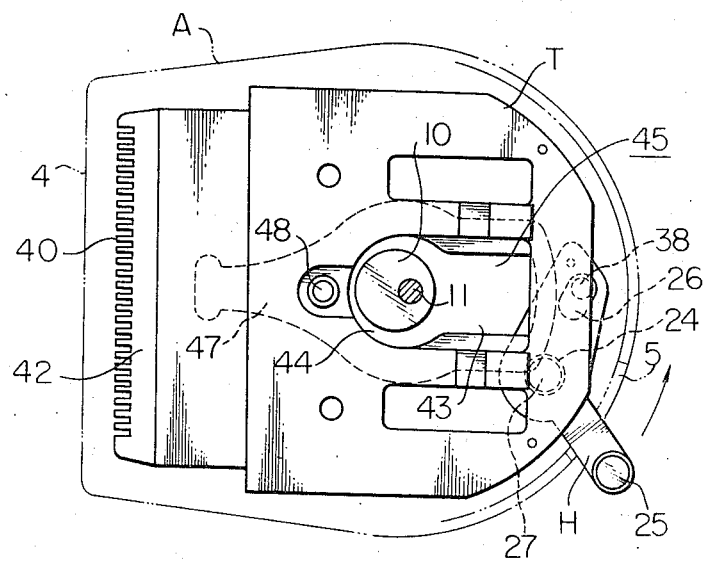
FIGS. 7A and 7B are explanatory views for showing the trimmer blade assembly in its retracted and extracted positions, respectively.

In the structure of the present invention as detailed in the above, the trimmer assembly T is normally kept retracted in the receptacle room 70 enclosed with upper surface of the head base member A and lower surface of the cover member 63, as shown in FIGS. 1 and 2, without exposing its blade faces 40 and 49 from the space 69. In this state, as illustrated in FIG. 7A, the trimmer driving lever 47 is in its free state where the eccentric cam 10 is at the position freely engaged in the round opening part 44 of cam receiving opening 45. Further, the nail projections 59, 59' of clutch plate 57 slidably mounted to the driving shaft 11 are engaged respectively with the engaging projections 9, 9' of disk member $a$ formed integrally with the eccentric cam 10 so as to be connected to the latter. The angular pillar 61 of said clutch plate 57 is, at this time, engaged in the angular hole 88 of inner cutter blade body 80 so as to be connected thereto and the driving shaft 11 is inserted in the shaft receiving deep hole 87 of inner cutter blade base 83 through the penetrating hole 62, so that only the rotary inner cutter blade body 80 is directly connected to the driving shaft 11 through the clutch plate 57.

Under these conditions, as the switch S is thrown into its ON state by operating the switch handle 8, a DC current source of the battery B is supplied to the motor M and its driving shaft 11 is rotated. At the same time, the eccentric cam 10 and disk member $a$ are simultaneously rotated. While the eccentric cam 10 will rotate freely within the round opening part 44, the disk member $a$ will drivingly rotate the clutch plate 57 which being engaged therewith. Thus, the inner cutter blade body 80 engagingly connected with the angular pillar 61 of said clutch plate 57 will be made to rotate, that is, only the rotary blade assembly E of the shaver will be driven at this time, so that the shaver will be employed in the usual shaving with its rotary blades.

Figure 7B:
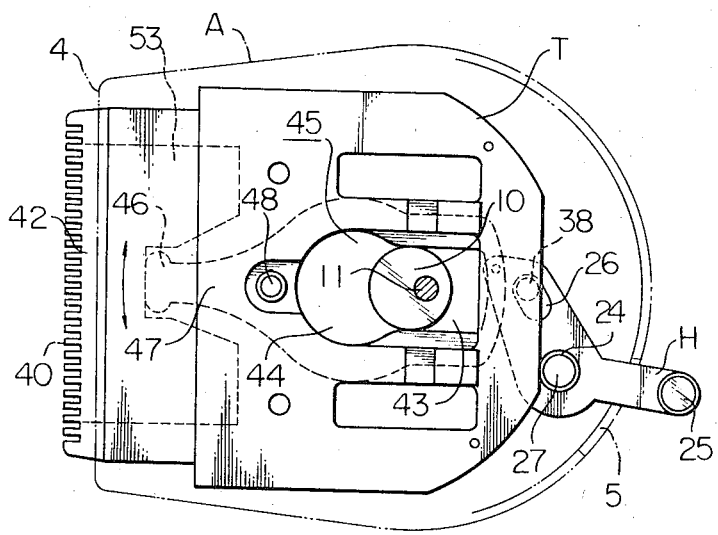

Now, as the trimmer handle knob 25 projected from outer periphery of the head base member A is pushed toward the direction indicated by an arrow in FIG. 7A, the trimmer operating lever H will be urged to shift into the position as illustrated in FIG. 7B by means of the clicking motion of click spring 22. At the time of the above shifting, the engaging pin 38 of trimmer base 39 engaged in the elongated hole 26 of said trimmer operating lever H will be biased by peripheral edge of said elongated hole 26 so that the trimmer assembly T will be moved toward the bill-like space 69 and, thus, the both blade faces 40 and 49 will be extracted out of the projected comb part 4. At the same time, the trimmer driving lever 47 is also made to shift so that the angular opening part 43 of its cam receiving opening 45 will engage with the eccentric cam 10. At the same moment, the clutch plate 57 will be pushed up by means of the projections 37, 37' having tapered edges of the trimmer base 39 as the trimmer assembly T is moved, so that the nail projections 59, 59' of clutch plate 57 will be released from the engagement with the engaging projections 9, 9' of disk member *a* and the clutch plate 57 will be elevated upwardly. Since the driving shaft 11 is merely passed through the penetrating hole 62 of clutch plate 57 and inserted into the shaft receiving deep hole 87 of inner cutter blade body 80 just for free rotation, said inner cutter blade body 80 will be caused to be released from the driving shaft 11 by the above mentioned release and elevation of the clutch plate 57 and, thus, the rotary blade assembly E will now be free from being driven and stop to rotate. On the other hand, only the trimmer driving lever 47 will now be driven by rotating eccentric cam 10 which is here in engagement with the angular opening part 43 of said lever 47 so as to reciprocally swing about the pin 48 as a fulcrum. Consequently, the engaging head 46 at the forward end of said reciprocating lever 47 will urge the inner trimmer cutter blade 53 to move reciprocally along the lower surface of the stationary trimmer cutter blade 42, so that hairs guided by comb of the projected comb part 4. It is thus possible to carry out the trimming operation only, by means of the trimmer assembly T now being driven independently.

When the above trimming operation is finished, the operator of the shaver will push the trimmer handle knob 25 from its position shown in FIG. 7B back to its original position shown in FIG. 7A. As a result, the trimmer assembly T will be retracted into its original position, so that the angular opening part 43 of cam hole 45 will be disengaged from the eccentric cam 10 and said trimmer assembly T will become free from being driven. At the same time, the clutch 57 will be no more maintained in its raised position as the projections 37 of the assembly T move away and will be lowered down, so that the nail projections 59 of clutch plate 57 will again mesh with rotating engaging projections 9 of disk member *a*. As the angular pillar 61 of clutch plate 57 is still in engagement with the angular hole 88 of the inner cutter blade body 80 even after the plate 57 is lowered, said block 80 is again connected to the driving shaft 11 through the both projections 9 and 59, while the trimmer assembly T is now made to be free from being driven.

Figure 8:
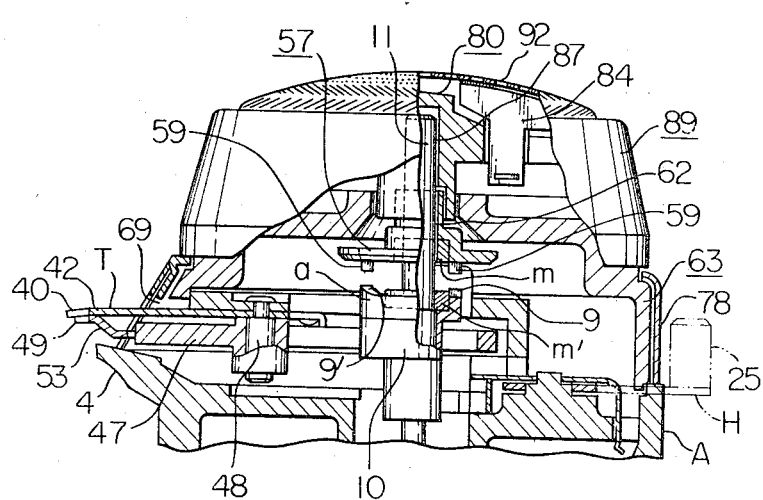
FIG. 8 is a fragmentary side view of the main parts shown partly in section as in FIG. 2, but in this instance the trimmer blade are in its extracted position to be used.

While the above mentioned lowering of the clutch plate 57 may possibly occur by the weight of clutch plate 57 itself, there is provided in the illustrative embodiment of the present invention a pair of permanent magnets *m, m'* of a ring shape, respectively secured in lower surface of the clutch plate 57 and upper surface of the disk member *a* so as to oppose to each other around the driving shaft 11 as the center. Therefore, as the pushing up force to the clutch plate 57 by means of the projections 37 is taken away, the clutch plate 57 will positively lowered by the magnetic attraction between said magnets *m, m'* as well as by the net weight of the plate 57, and will be held firmly in engagement with the disk member *a* (see FIGS. 2 and 8).

According to the present invention, as described in the above, such various advantages as follows are established. That is, since each of the rotary blade assembly and trimmer assembly is drivingly connected to the same driving shaft respectively in an independent manner of each other and they will never be driven simultaneously, the motor will be given a less load and, thus, the power consumption is less. During the use of the rotary blade assembly, the trimmer assembly will be retracted and contained in a receptacle therefor without being exposed to the outside and also without being driven, hence the shaver according to the invention successfully removes fear of danger and is less noisy. Further, by causing the trimmer operating lever to effect the clicking motion with a one touch operation of a finger tip of the hand holding the shaver, the trimmer blades will be able to be projected from an opening therefor, and simultaneously, the rotary blade assembly will be released from its engagement with the driving shaft by the same one touch operation. That is, in other words, the extracting and retracting operations of the trimmer blade assembly and shifting or exchange of the driving linkage between the trimmer blade assembly and the rotary blade assembly can be carried out in a very simple manner by the said one touch operation. At the same time, the provision of clicking spring for said clicking movement is effective in preventing the trimmer blade assembly as extracted from being undesirably retracted into the body during the use of the trimmer blade assembly. Furthermore, the shaver according to the invention will be featured with the disclosed structure that the driving source part is arranged to be beneath the head base member and the cover member for forming a receptacle for the trimmer assembly and for mounting thereon the outer rotary blade is arranged above the head base member, and that the tubular cover member for the driving source part is fixedly screwed to the head base member so as to be pulled upwardly by means of the projected engaging parts having an inclined screw face and, simultaneously, the bottom wall projection of the tubular cover member will bias the pushing up spring for holding the battery upwardly so that automatically the tubular cover member will be protected from being loosened.

What is claimed is:

1. An electric dry shaver comprising a head base member provided with a motor and a battery holder at the lower portion, said motor having a driving shaft penetrating through said head base member and provided with a cam mechanism, a hand operated switch means for connecting said motor to a battery held in said battery holder, a trimmer assembly slidably contained in a receptacle formed on the upper surface of said head base member, said trimmer assembly being provided with a cam means releasably engaged with said cam mechanism of the driving shaft, a trimmer operating means in engagement with said trimmer assembly for extracting the same, and a rotary blade assembly provided on said head base member, said rotary blade assembly being provided with a cam means releasably engaged with said cam mechanism of the driving shaft; during the time when said trimmer assembly is retracted in the receptacle only the cam means of said rotary blade assembly is made to engage with the driving shaft so that only the rotary blade assembly is rotated, and during the time when the trimmer assembly is extracted from the receptacle only the cam means of said trimmer assembly is made to engage with the driving shaft so that only inner trimmer blade of the trimmer assembly is driven.

2. The electric dry shaver according to claim 1, wherein said driving shaft having an eccentric cam, a disk member provided with engaging projections and a clutch plate slidably fitted to upper portion of the shaft and having, at a side, nail projections for engaging with said engaging projections of the disk member and, at the other side, an angular pillar for engaging with a rotary side of said rotary blade assembly; said trimmer assembly being provided at the upper side with projections arranged in parallel to each other and having tapered edges for engagement with said clutch plate, said trimmer assembly including a base above the assembly and fixed thereto a stationary flat blade, a movable flat blade having a cutting blade face and sustained in a manner reciprocally movable transversely said stationary flat blade, and a vibrating lever for reciprocally driving said movable flat blade; said vibrating lever having an opening comprising a narrower part for engagement with the eccentric cam in the position where the trimmer assembly is extracted and a wider part for disengagement with the eccentric cam in the position where the trimmer assembly is retracted so that the cam freely rotates therein; and said clutch plate being so arranged that, when said trimmer assembly is extracted by said trimmer operating means engaged with the assembly, the clutch plate will be disengaged with the disk member on the driving shaft by means of said projections of the trimmer base having the tapered edge.

3. The electric dry shaver according to claim 1, wherein said trimmer operating lever being provided with a click spring engaged at an end with the lever and at the other end with the head base member, so that said trimmer operating lever will be caused to effect a clicking movement when the same is operated, thereby the trimmer assembly will be urged to slidingly move and trimmer blade faces will be extracted from the receptacle opening.

4. The electric dry shaver according to claim 1, wherein said head base member including a plurality of downwardly inclined screw projections at the outer periphery, a battery holding metal member secured to said head base member and having a lower bent part provided with a battery pushing up spring fixed thereon, and a tubular cover member opened at an end and having a plurality of screw projections at inner periphery adjacent said opened end for engagement with said downward screw projections and a projection at the center of inside bottom wall, said tubular cover member being adapted to cover the motor and battery holding metal member as its said plurality of screw projections is engaged with said downwardly inclined screw projections of the head base member in such manner that the cover member will be brought into a close contact to lower surface of the head base member by means of the inclined screw projections and, at the same time, resiliency of the battery pushing up spring will be given to said inner bottom wall of the cover member, thereby a loosening protecting action will be automatically given to the cover member.

References Cited
UNITED STATES PATENTS 3,213,536   10/1965   Futterer              30—34.1
3,392,443    7/1968   Kawano             30—34.1

ROBERT C. RIORDON, Primary Examiner

G. F. GRAFEL, Assistant Examiner